(12) United States Patent
Kuscher et al.

(10) Patent No.: US 9,069,434 B1
(45) Date of Patent: Jun. 30, 2015

(54) ADJUSTING SIZES OF ATTACHED WINDOWS

(71) Applicant: Google Inc., Mountain View, CA (US)

(72) Inventors: Alexander Friedrich Kuscher, San Francisco, CA (US); John Nicholas Jitkoff, Palo Alto, CA (US); Scott Ronald Violet, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 13/659,707

(22) Filed: Oct. 24, 2012

(51) Int. Cl.
*G06F 3/048* (2013.01)
*G06F 9/44* (2006.01)
*G06F 3/0481* (2013.01)

(52) U.S. Cl.
CPC .............. *G06F 3/048* (2013.01); *G06F 9/4443* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 5,771,042 | A * | 6/1998 | Santos-Gomez | 715/800 |
| 5,812,123 | A * | 9/1998 | Rowe et al. | 725/43 |
| 5,819,055 | A * | 10/1998 | MacLean et al. | 715/798 |
| 5,977,973 | A * | 11/1999 | Sobeski et al. | 715/798 |
| 6,008,809 | A * | 12/1999 | Brooks | 715/792 |
| 6,597,383 | B1 * | 7/2003 | Saito | 715/860 |
| 6,717,600 | B2 * | 4/2004 | Dutta et al. | 715/862 |
| 7,080,326 | B2 * | 7/2006 | Molander et al. | 715/788 |
| 7,149,985 | B1 * | 12/2006 | Crosby et al. | 715/851 |
| 7,509,592 | B1 * | 3/2009 | Martinez | 715/862 |
| 8,302,026 | B2 * | 10/2012 | Wang et al. | 715/788 |
| 2006/0132460 | A1 * | 6/2006 | Kolmykov-Zotov et al. | 345/173 |

OTHER PUBLICATIONS

Apple, Logic Express 9, User Manual, 2009, Chapter 13—Resizing Regions.*
"Keeping windows on-screen", Endolith, Apr. 8, 2009, retrieved from <http://www.endolith.com/wordpress/category/computer-interfaces/window-managers/>.
"Joining window borders", Endolith, Aug. 9, 2008, retrieved from <http://www.endolith.com/wordpress/category/computer-interfaces/window-managers/>.
"Resizing windows", Endolith, Aug. 9, 2008, retrieved from <http://www.endolith.com/wordpress/category/computer-interfaces/window-managers/>.

* cited by examiner

*Primary Examiner* — Matt Kim
*Assistant Examiner* — Mahelet Shiberou
(74) *Attorney, Agent, or Firm* — McDermott Will & Emery LLP (57) ABSTRACT

A computer-implemented method for adjusting sizes of attached windows is provided. The method includes attaching two or more windows to each other to form a common border shared by each of the two or more attached windows, and providing a resize area for simultaneously adjusting sizes of the two or more attached windows when a user input indicator is within a predetermined proximity to the common border. The method also includes and simultaneously adjusting the sizes of the two or more attached windows when the user input indicator moves into the resize area and a resize input is received based on the user input indicator that has moved into the resize area. Systems and machine-readable media are also provided.

20 Claims, 5 Drawing Sheets

ADJUSTING SIZES OF ATTACHED WINDOWS

BACKGROUND

Operating systems installed on computer systems may employ user interfaces (UIs) (e.g., desktop screens) which typically utilize windows to manage the display of applications and other functionalities to users. Different applications may be simultaneously displayed in different windows.

SUMMARY

The subject technology relates to a computer-implemented method for adjusting sizes of attached windows. The method includes attaching two or more windows to each other to form a common border shared by each of the two or more attached windows, and providing a resize area for simultaneously adjusting sizes of the two or more attached windows when a user input indicator is within a predetermined proximity to the common border. The method also includes and simultaneously adjusting the sizes of the two or more attached windows when the user input indicator moves into the resize area and a resize input is received based on the user input indicator that has moved into the resize area.

The subject technology further relates to a system for adjusting sizes of attached windows. The system includes a memory storing executable instructions and a processor coupled to the memory configured to execute the stored executable instructions to determine whether two or more windows are within a predetermined proximity to each other, and attach the two or more windows to each other to form a common border shared by each of the two or more attached windows, when the two or more windows are determined to be within the predetermined proximity to each other. The processor is also configured to provide a resize area for simultaneously adjusting sizes of the two or more attached windows when a user input indicator is within a predetermined proximity to the common border, and simultaneously adjust the sizes of the two or more attached windows when the user input indicator moves into the resize area and a resize input is received based on the user input indicator that has moved into the resize area.

The disclosed technology also relates to a machine-readable storage medium comprising instructions stored therein, which when executed by processors, cause the processors to perform operations including determining whether two or more windows are within a predetermined proximity to each other and attaching the two or more windows to each other to form a common border shared by each of the two or more attached windows, when the two or more windows are determined to be within the predetermined proximity to each other. The method also includes providing a resize area for simultaneously adjusting sizes of the two or more attached windows when a user input indicator is within a predetermined proximity to the common border, the resize area including a portion of the common border and receiving a resize input for adjusting the size of at least one of the two or more attached windows. The method further includes determining whether the received resize input is received from inside the resize area, simultaneously adjusting the sizes of the two or more attached windows based on the received resize input if the received resize input is received from within the resize area, and determining an active window from the two or more attached windows and adjusting the size of the determined active window based on the received resize input if the received resize input is received from outside the resize area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Operating systems installed on computer systems may employ user interfaces (UIs) (e.g., desktop screens) which utilize windows to manage the display of applications and other functionalities to users. For example, a word processing application and a spreadsheet application may each be displayed at a different window. A user may simultaneously have multiple windows open on his or her desktop screen. However, arranging each of the windows such that all open windows are aligned with each other may be difficult, time-consuming, and require the user to move each of the respective windows individually. Resizing the aligned windows also requires the users to resize each of the windows individually.

According to various aspects of the subject technology, a method and a system for adjusting sizes of attached windows is provided. A window manager may be provided by the operating system which detects when two or more windows are within proximity to each other, and attaches the windows to form a common border when the two or more windows are within a predetermined distance from each other. For example, if the window manager detects that a left border of a first window is within a predetermined distance from a right border of a second window, the two windows are automatically attached to each other such that the right border of the first window and the left border of the second window form a single common border. The attachment may appear to the user as a magnetic force acting between the two borders to snap the two windows together. That is, when the two windows are placed within a predetermined distance from each other, the two windows automatically move toward each other without further user input.

The attached windows may be of arbitrary sizes. Each of the attached windows may have different heights or widths, or the attached windows may have the same height and/or width. The common border need not be the entire border of any window. Portions of borders of multiple attached windows may be attached to each other to form a single common border. Also, more than two windows may be attached together. For example, three windows may be attached in a "T" pattern, where two windows are horizontally attached, with a third window attached above or below the horizontally attached windows.

After the two windows are attached to each other, the common border may be manipulated by a user such that the sizes of the two attached windows are adjusted at the same time. For example, in case of a vertical common border, the user may utilize an input indicator (e.g., a mouse pointer or a finger for a touch-based system) to provide a resize input to move the common border to the right, causing the width of the right window to decrease. At the same time, the width of the left window increases by the same amount, in response to the decrease of the right window. In case of a horizontal common border, when the user moves the common border down, the height of the upper window increases as the height of the lower window decreases. As a first window is adjusted, the second window automatically adjusts on the same scale, to compensate for the adjustment of the first window. The adjustment is an inverse adjustment, that is, as the first window increases in size, the second window proportionally decreases.

When the user wishes to resize the attached windows, the user places the input indicator at or near the common border. When the input indicator is within a predetermined proximity to the common border, a resize area appears adjacent to the input indicator. The resize area also overlaps the common border. For example, in case of a vertical common border, when the input indicator is within a predetermined number of pixels of the common border or touches the common border, a resize area appears either below or above the input indicator, depending on how much of the common border stretches on either side of the input indicator. Specifically, if the input indicator is at the lower end of the common border and the majority of the common border stretches upward, then the resize area may appear above the input indicator. The resize area overlaps the common border and may be a few pixels wider than the common border such that the user may have extra room to comfortably provide the resize input.

According to an aspect of the disclosed technology, when the resize area appears, the resize area is displayed such that the input indicator is outside the displayed resize area. If the user wishes to provide a resize input to simultaneously resize both of the attached windows, the user may move the input indicator into the displayed resize area. After the input indicator is moved into the resize area, the user may provide the resize input by, for example, engaging and moving the common border to a desired position, from within the resize area.

Alternatively, if the user does not wish to simultaneously resize both of the attached windows but, instead, wishes to provide a resize input to adjust the size of only one window, the user may move the input indicator way from the resize area, and adjust the size of a single window by, for example, engaging the common border outside of the resize area and moving it to a desired position. In this case, the size of the window which is in focus (e.g., the active window or the window to which the user provided input immediately before the resize input) will be adjusted.

Figure 1:
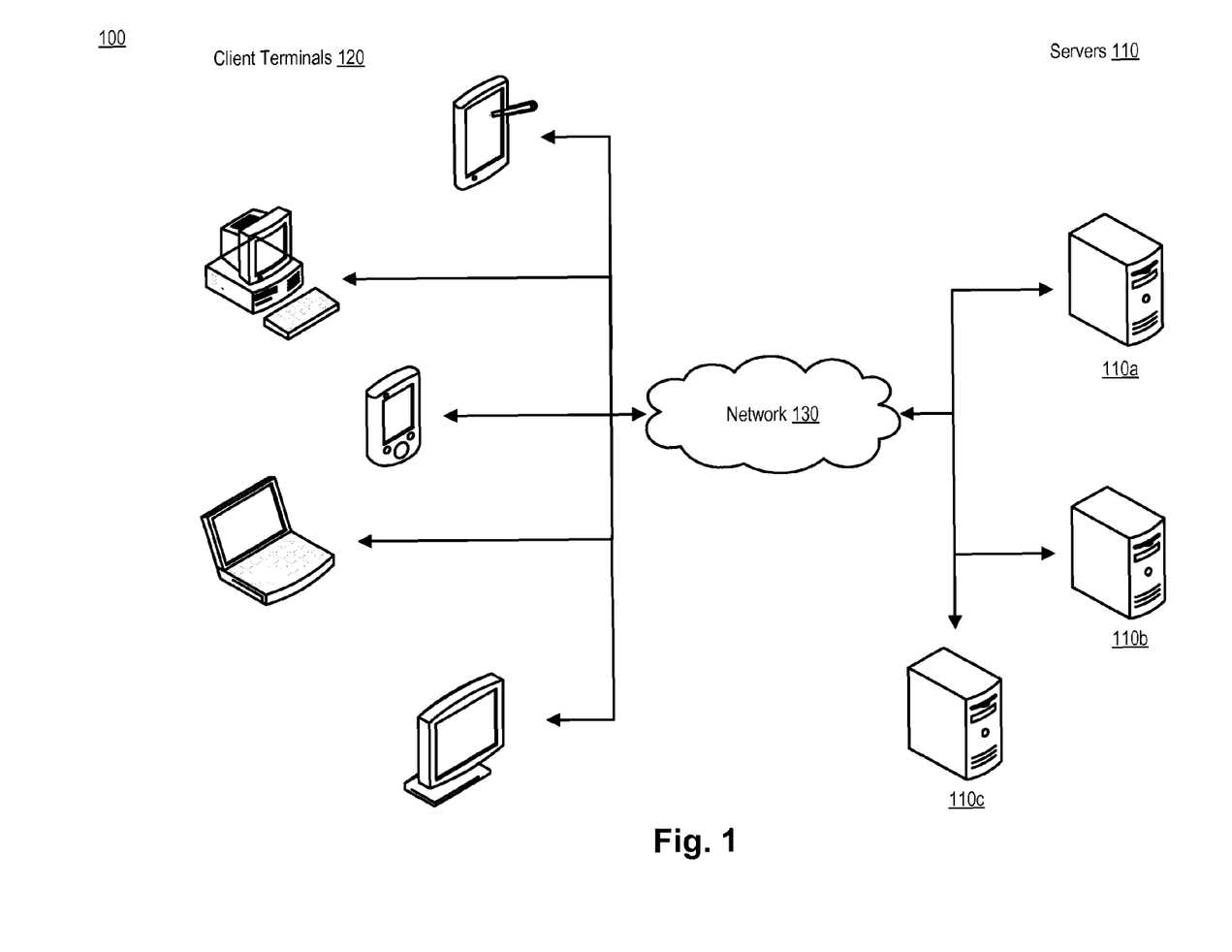
FIG. 1 illustrates an example architecture for adjusting sizes of attached windows.

FIG. 1 illustrates an example architecture 100 for adjusting sizes of attached windows. The architecture 100 includes servers 110 and client terminals 120 connected over a network 130. The client terminals 120 may be any computer system or any device having a processor, memory and communications capability for running operating systems which utilize windows to manage display of applications, and for receiving user input for resizing displayed windows. The client terminals 120 may also communicate with the servers 110 to send and receive data for adjusting sizes of attached windows. The client terminals 120 may be, for example, desktop computers, laptop computers, tablet computers, smart phones, televisions or other devices that employ user interfaces (UIs) which utilize windows to manage the display of applications and other functionalities to users.

The servers 110 may be any computer system or device having a processor, memory, and communications capability for communicating with the client terminals 120. For example, the servers 110 may send content such as web pages to the client terminals 120 for display on the attached windows of the client terminals. The servers 110 may be a single server, or may be two or more servers communicating with each other. For example, the servers 110 may be multiple servers arranged in a cloud computing configuration.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
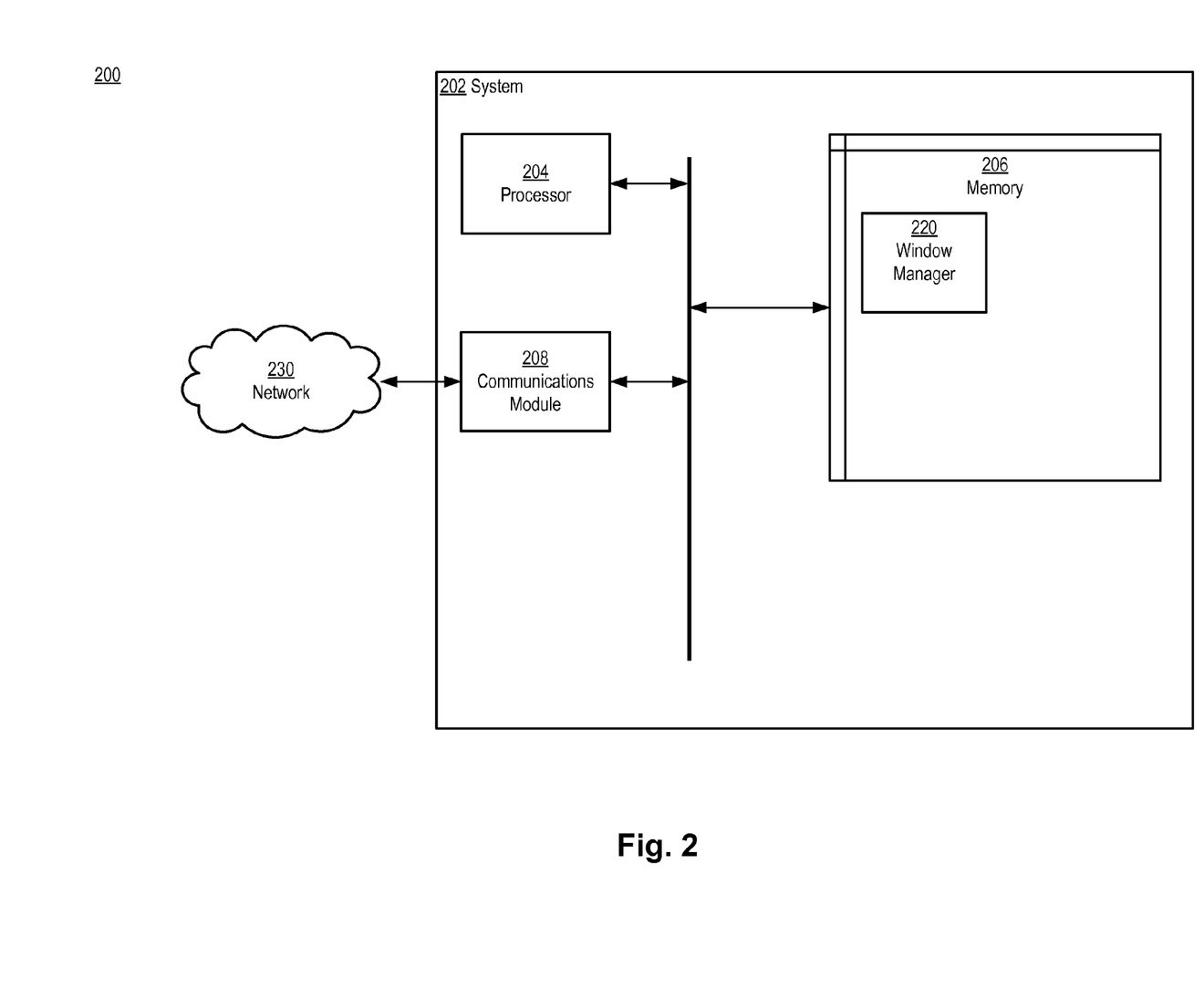
FIG. 2 is a block diagram illustrating an example system for adjusting sizes of attached windows.

FIG. 2 is a block diagram 200 illustrating an example system 202 for adjusting sizes of attached windows. The system 202 may be implemented, for example, at one of servers 110. The system 202 may also be implemented, for example, across multiple servers 110, at one of the client terminals 120, or spread across the servers 110 and client terminals 120. The system 202 includes a processor 204 and a memory 206. The system 202 may also include a communications module 208, and may be connected to a network 230 via the communications module 208. The network 230 may be, for example, the network 130 of FIG. 1. The communications module 208 may be configured to interface with the network 230 to send and receive information, such as data, requests, responses, and commands to other devices (e.g., servers 110 or client terminals 120) or systems on the network 230. The communications module 208 may be, for example, modems, Ethernet cards or mobile broadband adaptors.

The memory 206 includes a window manager 220. Window manager 220 includes logic for displaying and managing windows in which computer applications are displayed. For example, window manager 220 includes logic for determining sizes of windows being displayed, receiving resize inputs from users to adjust the sizes of the displayed windows. The window manager 220 also includes logic to determine whether two windows are near each other, and whether to automatically attach the two windows together when the distance between the two windows is less than a threshold. The window manager 220 may be part of an operating system running at the system 202. In an aspect of the disclosed technology, the memory 206 may be implemented to be independent from the system 202 and in communication with the system 202.

The processor 204 is configured to execute instructions, such as instructions physically coded into the processor, instructions received in the form of software from the memory 206, or a combination of both. For example, the processor 204 is configured to execute instructions to determine whether two or more windows are within a predetermined proximity to each other on a user interface (UI) of a computer system. The processor 204 is also configured to execute instructions to attach the two or more windows to each other to form a common border shared by each of the two or more attached windows, when the two or more windows are determined to be within the predetermined proximity to each other. The processor 204 is further configured to execute instructions to provide for display a resize area for simultaneously adjusting sizes of the two or more attached windows when a user input indicator is within a predetermined proximity to the common border, and simultaneously adjust the sizes of the two or more attached windows when the user input indicator moves into the displayed resize area and a resize input is received based on the user input indicator that has moved into the displayed resize area.

Figure 3:
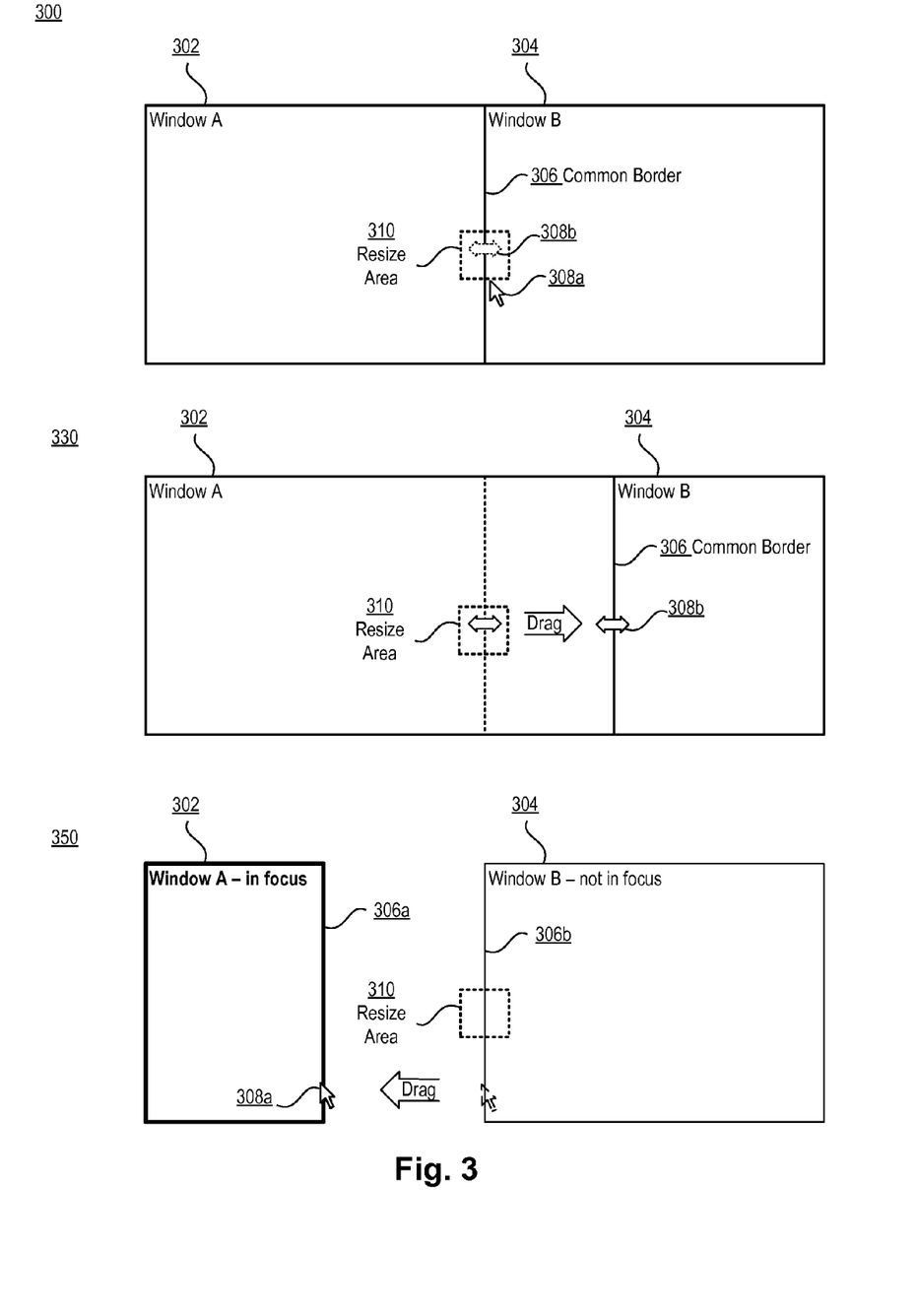
FIG. 3 shows diagrams illustrating example operations for adjusting sizes of attached windows.

FIG. 3 shows diagrams 300, 330 and 350 which illustrate example operations for adjusting sizes of attached windows. The operations may be performed, for example, by system 202. Two windows attach to each other when a window manager (e.g., window manager 220) determines that borders of the two windows are within a predetermined proximity from each other. When a user provides a move input to move a window (e.g., clicks on a predetermined area of the window using an input indicator (e.g., a mouse pointer or a user's finger) to drag the window to a desired location on the screen), the window manager determines whether borders of other windows are within a predetermined number of pixels from any border of the window being moved. For example, the window manager may determine whether borders of other windows are within 8 pixels of any border of the window being moved. If a border of another window is determined to be present within 8 pixels of the border of the window being moved, the window manager attaches the two windows together such that the two borders that were within 8 pixels within each other are merged into a single, common border.

The window manager can attach the two windows together by automatically further moving toward the stationary window the window that had previously been moved by the user but had stopped short of the stationary window. Therefore, the two proximate windows attach to each other to form a common border if the borders of the two windows are within a predetermined proximity from each other, without an express instruction from a user to attach the two windows. That is, it may appear to the user that the two windows are pulled toward each other and are snapped together, when the windows are sufficiently close to each other. After the windows have been attached, the user may separate the attached windows by providing further move input to move one of the attached windows.

Diagram 300 shows two windows (window 302 and window 304) that have been attached to form a common border 306. When a user places the input indicator 308a within a predetermined distance from the common border 306, a resize area 310 is displayed adjacent to the input indicator. The resize area 310 is displayed such that the resize area does not overlap with the input indicator 308a. For example, the resize area 310 may be displayed a predetermined number of pixels (e.g., 2-3) above or below the input indicator 308a. Further, the displayed resize area 310 intersects a portion of the common border 306, and covers a predetermined amount of each window on either side of the common border 306.

Diagram 300 shows an example resize area 310 having a rectangular shape which is displayed immediately above the input indicator 308a, intersects a portion of the common border 306 and covers a predetermined amount of each window on either side of the common border. The resize area 310 may be formed of various other shapes such as, for example, a circle, a square, an ellipse, or other types of polygons. The resize area 310 may be visually distinguished from the rest of the windows 302 and 304 by using different colors, shading and outlining the periphery of the resize area.

When the user wishes to simultaneously adjust the sizes of the attached windows 302 and 304, the user may position the input indicator 308a inside the displayed resize area 310. In an aspect of the subject technology, when the user places the input indicator into the resize area 310, the input indicator may be visually transformed into a different shape, such as the input indicator 308b, to notify the user that the input indicator has entered to resize area 310. After the user positions the input indicator 308a inside the resize area 310, the user may provide a resize input for simultaneously adjusting the sizes of both windows 302 and 304 by, for example, engaging (e.g., clicking or tapping) anywhere within the resize area 310 and dragging the common border 306 in a desired direction.

Diagram 330 shows that a user has positioned the input indicator 308a inside the resize area 310, and engaged a common border 306 within the resize area 310 to move the common border 306 to the right. As a result, the width of window 302 is increased proportionally to the decrease in the width of window 304. The non-common borders of both windows 302 and 304 do not move when the common border 306 is moved.

If, after the resize area 310 has been displayed, the user wishes to adjust the size of only one window, the user may position the input indicator 308a outside the resize area 310 and provide a resize input outside the resize area 310. For example, the user may click on or tap on the common border 306 outside the resize area and begin dragging the common border 306 in a desired direction. The window that was in focus, or active, immediately before the user's resize input is the window that is resized. A window comes into focus or becomes active when the user interacts with the window. The focus switches to another window when the user interacts with the other window.

Diagram 350 shows that the user had positioned the input indicator 308a outside the resize area 310 and engaged what used to be the common border 306 outside the resize area to move what used to be the common border 306 to the left. Because what used to be the common border 306 was moved by engaging outside the resize area 310, only the width of window 302, which was in focus, was resized. Only the width of window 302 is adjusted, and two separate borders 306a and 306b are created for window 302, and window 304, respectively. The size of window 304 remains unchanged.

The foregoing description for resizing windows also applies to windows that are attached vertically. Attaching two windows vertically creates a horizontal common border, and the user may drag the common border up or down inside the resize area in order to adjust the height of both windows at the same time. Moving the common border outside the resize area adjusts the height of only the window that is in focus.

Further, multiple windows may be attached to form a single common border. For example, two windows may be attached together horizontally, while a third window is vertically attached above or below the two horizontally attached windows. A border of the vertically attached window may attach to both of the two horizontally attached windows, forming a common border shared by all three windows. In an aspect of the subject technology, moving the common border at the resize area may adjust the sizes of all three windows sharing the common border. For example, dragging the common border shared by all three windows upward decreases the height of the vertically attached window, while at the same time, increasing the height of both of the horizontally attached windows. The sizes of windows can be similarly adjusted for attached windows where two windows are attached vertically and a third window is horizontally attached to the left or right of the vertically attached windows.

Figure 4:
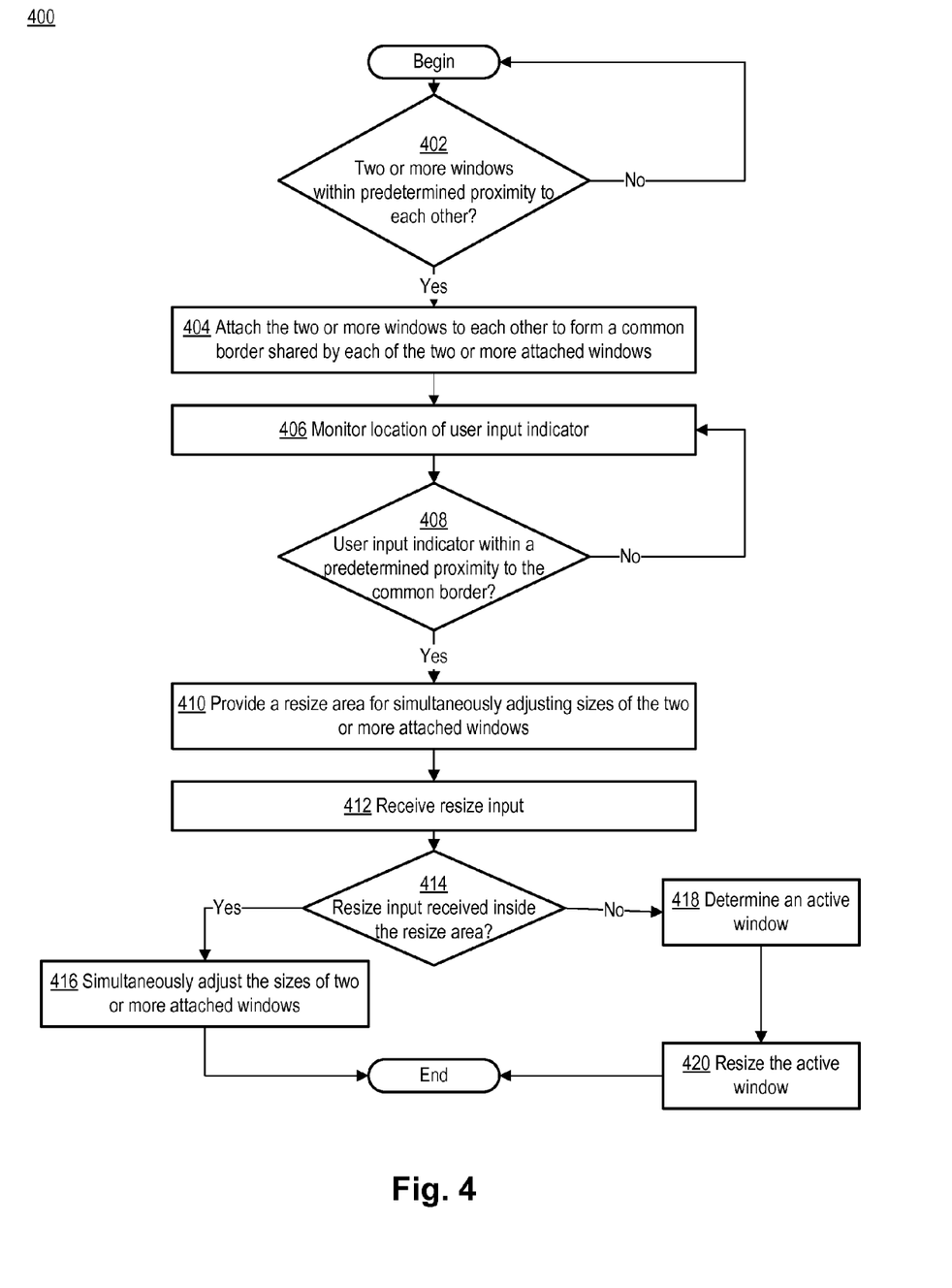
FIG. 4 illustrates an example flow diagram of example process for adjusting sizes of attached windows.

FIG. 4 illustrates a flow diagram of example process 400 for adjusting sizes of attached windows. The process 400 may be performed by, for example, system 202. However, the process 400 is not limited to such a system, and may be performed using other systems/configurations.

Process 400 begins at block 402 where a determination is made as to whether two or more windows are within a predetermined proximity to each other. Such determination may be made, for example, by the window manager 220. When two or more windows are determined to be within a predetermined proximity to each other, the two or more windows are attached to each other to form a common border that is shared by each of the two or more attached windows at block 404. Attaching the two or more windows to each other may appear to the user as if the windows are being snapped together. The common border need not be the entire border of any window, and portions of the borders of the attached windows may be attached to each other to form the common border. The attachment of the two or more windows may also be made, for example, by the window manager 220. If no windows are determined to be within the predetermined proximity to each other, process 400 reverts to the beginning.

At block 406, location of a user's input indicator (e.g., input indicator 308a) is monitored, and a determination is made, at block 408, as to whether the user's input indicator is within a predetermined proximity to the common border. If the user's input indicator is within the predetermined proximity to the common border, at block 410, a resize area for simultaneously adjusting the sizes of the two or more attached windows is provided. The resize area may be provided, for example, by displaying the resize area to be at a predetermined number of pixels above or below the user's input indicator, and to intersect a portion of the common border. If the user's input indicator is not within the predetermined proximity to the common border, process 400 reverts to block 406.

At block 412 a resize input is received from the user. The user may provide the resize input by moving the common border (e.g., clicking or tapping at the common border, and dragging the common border) in a desired direction. At block 414, determination is made as to whether the resize input is received inside the resize area. If the resize input is received inside the resize area, at block 416, the sizes of the two or more attached windows are simultaneously adjusted based on the received resize input. If determination is made at block 414 that the resize input is received outside the resize area, at block 418, an active window is determined from the two or more attached windows. A window becomes active when the user interacts with the window. At block 420, only the size of the active window is adjusted, based on the received resize input.

Figure 5:
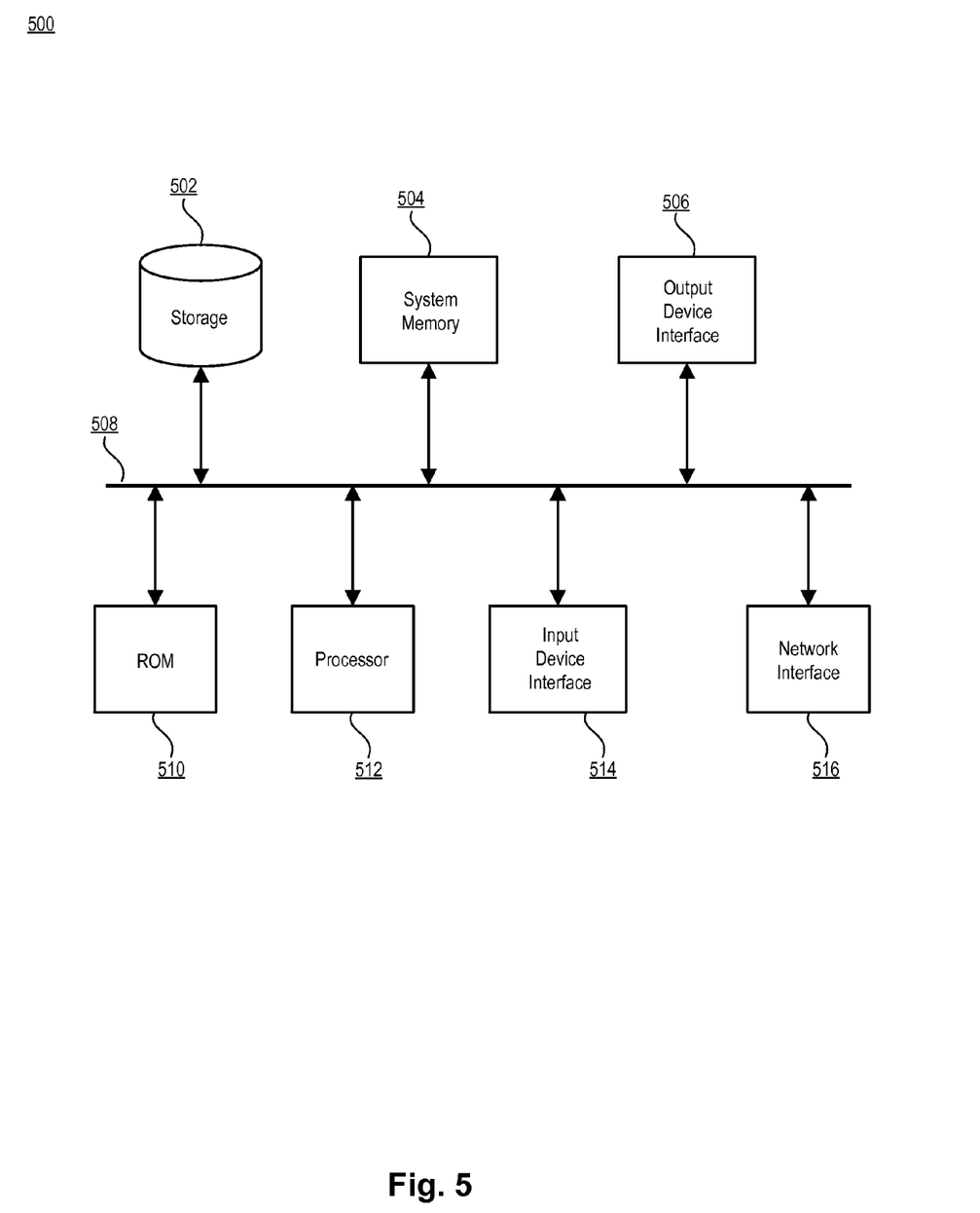
FIG. 5 conceptually illustrates an electronic system with which some implementations of the subject technology are implemented.

FIG. 5 conceptually illustrates electronic system 500 with which any implementations of the subject technology are implemented. Electronic system 500, for example, can be a desktop computer, a laptop computer, a tablet computer, a server, a switch, a router, a base station, a receiver, a phone, a personal digital assistant (PDA), any device that provides for adjusting of sizes of attached windows, or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as televisions or other displays with one or more processors coupled thereto or embedded therein, or other appropriate computing devices that can be used for running an application. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Terms such as "top," "bottom," "front," "rear" and the like as used in this disclosure, if any, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for adjusting sizes of attached windows, the method comprising:
   attaching two or more windows to each other to form a common border shared by each of the two or more attached windows;
   providing a resize area covering a portion of the common border and an amount of each of the two or more windows when a user input indicator is within a predetermined proximity to the common border;
   providing for display of the resize area adjacent to the user input indicator, wherein the display of the resize area is visually distinguished from other portions of the two or more windows not covered by the resize area; and
   simultaneously adjusting the sizes of the two or more attached windows when the user input indicator moves into the resize area and a resize input is received based on the user input indicator that has moved into the resize area.

2. The method of claim 1, further comprising determining whether the two or more windows are within a predetermined proximity to each other;
   wherein the step of attaching comprises attaching the two or more windows to each other when the two or more windows are determined to be within the predetermined proximity to each other.

3. The method of claim 1, wherein the two or more attached windows have different heights.

4. The method of claim 1, wherein the two or more attached windows have different widths.

5. The method of claim 1, wherein the resize area for simultaneously adjusting sizes of the two or more attached windows is configured to be visually distinguished from the rest of the two or more windows outside of the resize area.

6. The method of claim 1, wherein the resize area is adjacent to the user input indicator that is within the predetermined proximity of the common border.

7. The method of claim 1, wherein the attached two or more windows comprises two windows that are horizontally attached, and a third window that is vertically attached to both of the horizontally attached windows, wherein a border of the third window is attached to portions of both horizontally attached windows.

8. The method of claim 1, wherein the two or more windows are displayed on a user interface of a computer system.

9. A system for adjusting sizes of attached windows, the system comprising:
   a memory storing executable instructions; and
   a processor coupled to the memory configured to execute the stored executable instructions to:
      determine whether two or more windows are within a predetermined proximity to each other;
      attach the two or more windows to each other to form a common border shared by each of the two or more attached windows, when the two or more windows are determined to be within the predetermined proximity to each other;
      provide a resize area covering a portion of the common border larger than a shared point of the two or more attached windows for simultaneously adjusting sizes of the two or more attached windows when a user input indicator is within a predetermined proximity to the common border;
      provide for a visually distinguished display of the resize area; and
      simultaneously adjust the sizes of the two or more attached windows when the user input indicator is placed inside the displayed resize area and a resize input is received based on the user input indicator that is placed inside the displayed resize area.

10. The system of claim 9, wherein the two or more attached windows have different heights.

11. The system of claim 9, wherein the two or more attached windows have different widths.

12. The system of claim 9, wherein the resize area for simultaneously adjusting sizes of the two or more attached windows intersects a portion of the common border.

13. The system of claim 9, wherein the resize area is adjacent to the user input indicator that is within the predetermined proximity of the common border.

14. The system of claim 9, wherein the attached two or more windows comprises two windows that are horizontally attached, and another window that is vertically attached to both of the horizontally attached windows.

15. The system of claim 9, wherein the two or more windows are displayed on a user interface of a computer system.

16. A non-transitory machine-readable storage medium comprising instructions stored therein, which when executed by processors, cause the processors to perform operations comprising:
   determining whether two or more windows are within a predetermined proximity to each other;
   attaching the two or more windows to each other to form a common border shared by each of the two or more attached windows, when the two or more windows are determined to be within the predetermined proximity to each other;
   providing a resize area for simultaneously adjusting sizes of the two or more attached windows when a user input indicator is within a predetermined proximity to the common border, the resize area including a portion of the common border larger than a shared point of the two or more attached windows;
   providing for a visually distinguished display of the resize area, wherein the visually distinguished displayed resize area and the user input indicator do not overlap;
   receiving a resize input for adjusting the size of at least one of the two or more attached windows;
   determining whether the received resize input is received from inside the resize area;
   simultaneously adjusting the sizes of the two or more attached windows based on the received resize input if the received resize input is received from within the resize area; and
   determining an active window from the two or more attached windows and adjusting the size of the determined active window based on the received resize input if the received resize input is received from outside the resize area.

17. The non-transitory machine-readable storage medium of claim 16, wherein the resize area is adjacent to the user input indicator that is within the predetermined proximity of the common border.

18. The non-transitory machine-readable storage medium of claim 16, wherein the attached two or more windows comprises two windows that are horizontally attached, and another window that is vertically attached to both of the horizontally attached windows, wherein the common border in the resize area is configured to adjust the sizes of all of the windows relative to the position of the common border.

19. The method of claim 1, further comprising:
   determining that one of the two or more windows is active; and
   adjusting the size of only the determined active window of the two or more windows when another resize input is received at the common border outside of the resize area.

20. The system of claim 9, wherein the processor is further configured to:
   determine that one of the two or more windows is active; and
   adjust the size of the determined active window when another resize input is received at the common border outside of the resize area.

* * * * *